July 7, 1925.

J. W. BECK

BOLT LOCK

Filed Sept. 11. 1923

1,545,182

Joseph W. Beck,
Inventor

Witnesses:

Patented July 7, 1925.

1,545,182

UNITED STATES PATENT OFFICE.

JOSEPH W. BECK, OF SPOKANE, WASHINGTON.

BOLT LOCK.

Application filed September 11, 1923. Serial No. 662,044.

*To all whom it may concern:*

Be it known that I, JOSEPH W. BECK, citizen of the United States, residing at Spokane, in the county of Spokane and State of Washington, have invented certain new and useful Improvements in Bolt Locks, of which the following is a specification.

This invention relates to certain new and useful improvements in bolt locks, and has particular reference to an improved form of bolt locking washer adapted to be employed upon bolts used in large or heavy structural work such as the building or repair of railway cars, etc.

When nuts have been in position upon their bolts for some time, it is usually difficult to remove them, because the bolts will turn with the nuts. Thus, in such cases where the bolt head is not readily accessible to be grasped by a ridge or the like, it is extremely hard, if not impossible, to remove the bolt for repair purposes, unless the structure adjacent the bolt is dismantled and oftentimes destroyed.

It is accordingly an object of the present invention to provide means whereby this difficulty is overcome, the invention embodying the desired qualities of simplicity, durability and efficiency in operation.

Other objects will appear as the nature of the invention is better understood, and the same consists in the novel form, combination, and arrangement of parts hereinafter more fully described, shown in the accompanying drawing and claimed.

In the drawing, wherein like reference characters indicate corresponding parts throughout the several views.

Figure 1:
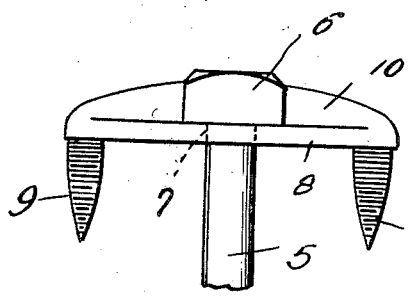
Figure 1 is a side elevational view of one form of bolt locking washer constructed in accordance with the present invention, and shown operatively disposed upon the shank of the bolt, the latter being partly broken away.

Referring more in detail to the drawing, the present invention is adapted to be employed upon an ordinary structural bolt 5 having a round shank and provided with a polygonal head 6. The form of the invention shown in Figures 1 and 2 consists of an elongated plate or washer having a central circular opening as at 7 through which the shank of the bolt 5 is adapted to be positioned, the under or inner surface 8 of said plate being flattened so as to flatly engage the structure through which the bolt is passed, and a plurality of rigid prongs 9 being provided upon the iner surface of the plate so as to extend parallel with the bolt 5 as shown. The prongs 9 are preferably barbed or indented as shown in Figure 1 so that they will effectively hold in the material for preventing rotation or detachment of the washer, and it is noted that these prongs 9 are of relatively stout or heavy construction so as to effectively serve their purpose and resist bending or breakage, such as is likely with cheap metal spurs from which they are distinguished. Upon the outer surface of the plates are a plurality of upstanding walls 10 having flattened opposed faces adapted to flatly engage the front side of the bolt head 6 when the latter is positioned in contact with the plate, whereby turning movement of the bolt relative to the plate is effectively prevented. In the form of the invention shown in Figures 1 and 2, the walls 10 consist of opposed lugs at opposite ends of the washer plate adapted to engage at opposite sides of the bolt head.

Figure 3:
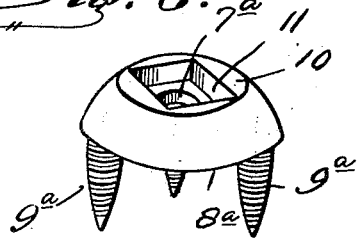
Figure 3 is a perspective view of a slightly modified form of the invention.

In the form of the invention shown in Figure 3, the washer is made of circular form and the walls 10ᵃ are divided by forming a hollow boss upon the outer surface of the washer which has a polygonal socket adapted for snug reception of the bolt head, the socket being generally indicated at 11. This form of the invention embodies the integral inwardly projecting barbs or indented prongs 9ᵃ and the plate is also provided with the inner flattened surface 8ᵃ. Also, the usual central opening 7ᵃ is provided in the washer for reception of the bolt shank.

Figure 4:
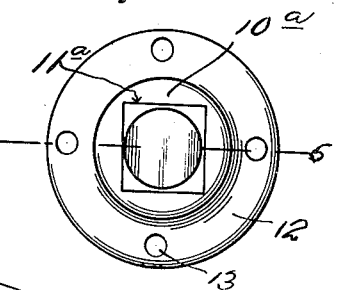
Figure 4 is a view similar to Figure 2, showing a still further modification of the invention.
Figure 5:
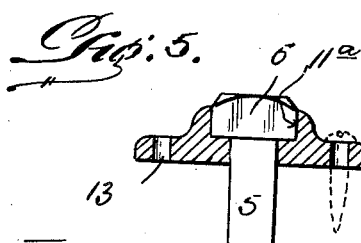
Figure 5 is a transverse sectional view, taken substantially upon line 5—5 of Figure 4.

In the form of the invention shown in Figures 4 and 5, the construction is substantially the same as shown in Figure 3, excepting that the prongs 9 are eliminated, and an annular flange 12 is provided about the socket 11ª said flange being provided with a series of openings 13 through which removable prongs may be driven, such prongs being preferably in the nature of ordinary wedge screws, (not shown).

Figure 2:
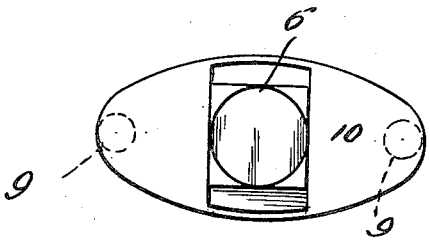
Figure 2 is a top plan view of the device shown in Figure 1.
Figure 6:
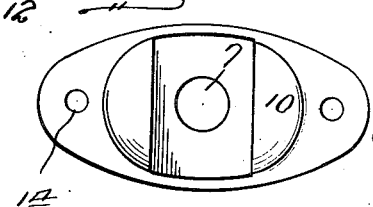
Figure 6 is a plan view of still another form of the invention.

As shown in Figure 6, the form of the invention shown in Figures 1 and 2 may be modified by simply providing perforations 14 at the ends of the washer plate through which screws or the like may be driven to provide the necessary prongs for holding the plate against rotation, the integral prongs 9 being thereby eliminated in this form of the invention. Otherwise, the construction is substantially the same in Figure 6 as in Figure 1.

In operation, the washer is adjusted upon the round shank of the bolt next to its head, as shown in several of the views. The washer is then driven toward the wood or work so as to cause the prongs to penetrate the same, or, the separate prongs are driven into the wood as the case may be, after which the nut is placed upon the bolt until the head of the latter is disposed between the flat spaced walls of the socket, whereupon the bolt is effectively prevented from turning.

Minor changes may be made without departing from the spirit and scope of the invention as claimed.

What I claim as new is:

A bolt lock comprising a comparatively heavy body increased in thickness from its edges toward its center, said body being provided at its center with an opening for passage of the shank of a bolt, the thickened central portion of the body being provided with a recess forming a pair of spaced opposed upstanding walls, the opposed faces of said walls being flattened to engage opposed flattened surfaces of the head of the bolt, the remaining opposed surfaces of said head being exposed and accessible, the entire under side of said body being flat to lie in intimate contact throughout its area with the part to be engaged, and integral prongs extending laterally from the flattened under side of the body and provided with anti-slipping means to prevent accidental displacement of the body.

In testimony whereof I affix my signature.

JOSEPH W. BECK.